(12) United States Patent
Hodgkinson

(10) Patent No.: US 7,254,126 B2
(45) Date of Patent: Aug. 7, 2007

(54) COMMUNICATIONS NETWORK

(75) Inventor: Terence G Hodgkinson, Woodbridge (GB)

(73) Assignee: British Telecommunications public limited company, London (GB)

( * ) Notice: Subject to any disclaimer, the term of this patent is extended or adjusted under 35 U.S.C. 154(b) by 1112 days.

(21) Appl. No.: 10/221,556

(22) PCT Filed: Mar. 28, 2001

(86) PCT No.: PCT/GB01/01384

§ 371 (c)(1),
(2), (4) Date: Sep. 13, 2002

(87) PCT Pub. No.: WO01/76158

PCT Pub. Date: Oct. 11, 2001

(65) Prior Publication Data

US 2003/0103456 A1  Jun. 5, 2003

(30) Foreign Application Priority Data

Mar. 31, 2000  (EP) ................................. 00302772

(51) Int. Cl.
*H04L 12/28* (2006.01)
*H04L 12/56* (2006.01)
(52) U.S. Cl. ...................................... 370/352; 370/400
(58) Field of Classification Search ................. 370/486
See application file for complete search history.

(56) References Cited

U.S. PATENT DOCUMENTS

| | | | |
|---|---|---|---|
| 4,991,204 A * | 2/1991 | Yamamoto et al. | 379/221.01 |
| 5,331,635 A | 7/1994 | Ota | |
| 5,390,174 A * | 2/1995 | Jugel | 370/392 |
| 5,602,992 A | 2/1997 | Danneels | |
| 5,933,425 A * | 8/1999 | Iwata | 370/351 |
| 6,097,718 A * | 8/2000 | Bion | 370/351 |
| 6,226,673 B1 * | 5/2001 | Yoshimoto | 709/223 |
| 6,542,496 B1 * | 4/2003 | Hirota et al. | 370/351 |
| 6,781,996 B1 * | 8/2004 | Hemmady | 370/395.21 |

FOREIGN PATENT DOCUMENTS

EP  0735726 A2  10/1996

OTHER PUBLICATIONS

Key et al, "Distributed Dynamic Routing Schemes", IEEE Communications Magazine, Oct. 1990, pp. 54-64.

* cited by examiner

*Primary Examiner*—Chau Nguyen
*Assistant Examiner*—Jordan Hamann
(74) *Attorney, Agent, or Firm*—Nixon & Vanderhye P.C.

(57) ABSTRACT

Nodes in a datagram network are arranged to route datagrams in dependence on a batch start time parameter contained in the header of datagrams belonging to a batch. A network operator is thus able to offer a service that is connection-oriented at the batch level, without necessarily being connection-oriented at the message level. This is advantageous to the network operator since it allows the packet flow generated by the user to be re-routed during the transmission of the message. The user can arrange those datagrams which are required to be delivered from the network in the same order as they are supplied to the network into batches. In that way, the user is not adversely affected by route changes made by the network operator in order to improve the performance of the datagram network.

6 Claims, 8 Drawing Sheets

| Destination IP address | Route Number | route update Time | Next Hop | Physical Output Port |
|---|---|---|---|---|
| 204.12.240.0/20 | 1 | 19:48:01.00 | 204.00.01.2 | Serial 0 |
| 204.12.240.0/20 | 2 | 19:48:03.90 | 204.00.02.2 | Serial 0 |

Figure 3

| Version | IHL | Type of Service | Total Length | | |
|---|---|---|---|---|---|
| Identification | | | DF | MF | |
| Time to Live | | Protocol | Header Checksum | | |
| 204.20.74.21 | | | | | |
| 204.12.245.2 | | | | | |
| QCO option | | | 19:48:03.75 | | |
| IP Packet A6 - Payload | | | | | |

Figure 6

| Version | IHL | Type of Service | Total Length | | |
|---|---|---|---|---|---|
| Identification | | | DF | MF | |
| Time to Live | | Protocol | Header Checksum | | |
| 204.20.74.21 | | | | | |
| 204.12.241.10 | | | | | |
| IP Packet B6 - payload | | | | | |

Figure 7

COMMUNICATIONS NETWORK

This application is the US national phase of international application PCT/GB01/01384 filed 28 Mar. 2001 which designated the U.S.

BACKGROUND

1. Technical Field

According to an exemplary embodiment of the present invention, there is provided a method of operating a datagram network node having at least one input channel and a plurality of output channels, said method comprising the steps of:

2. Related Art

It is now common for messages (whether they be telephone conversations or data file transfers) to be divided into packets before transmission across a communications network. This is advantageous to the operator of the communications network because packets from one message can be interspersed with packets from another message. That enables a more efficient utilisation of the available network resources.

Some packet networks offer the user a connectionless service. This means that a user using the network to transfer packets cannot rely on the network to output the packets in the same order he or she puts them in. In applications such as data transfer between two computers, the burden this places on the user is found to be acceptable. This is because computers are often supplied with networking software which controls the computer to attach a sequence number to each outgoing packet when it acts as a sender and to order received packets in accordance with their sequence number when it acts as a receiver.

Other packet networks offer the user a connection-oriented service. Here, the network can be relied on to output the packets derived from a given message in the same order as that in which they are supplied to the network. In practice, in order to offer such a service it is found necessary to send every one of the packets derived from a given message along the same route. Most telecommunications networks provide a connection-oriented service and this requirement for persistent routes reduces a telecommunications network operator's ability to manage the traffic traversing its network. Over recent years, computer data has provided an increasing proportion of telecommunications traffic. As explained above, data transfer between computers does not require a connection-oriented service—hence a telecommunications network that can take advantage of this and offer a connection-oriented service only to those that require it is becoming increasingly desirable.

BRIEF SUMMARY

According to the present invention, there is provided a method of operating a datagram network node having at least one input channel and a plurality of output channels, said method comprising the steps of:

forwarding a leading subset of a batch of datagrams in accordance with a stored extant route entry comprising an indication of a datagram-carried route identifier and an associated extant output channel;

storing a new route entry comprising an indication of said datagram-carried route identifier and an associated new output channel;

forwarding one or more datagrams in accordance with said new route entry;

subsequently identifying one or more datagrams as members of a trailing subset of said batch of datagrams; and forwarding members of said trailing subset in accordance with said extant route entry.

By operating the node to forward a trailing subset of a batch of datagrams received after a routing update over the same channel as a leading subset received before the routing update, the likelihood of the datagram network re-ordering the packets in said batch is reduced. Furthermore, the user is offered a continuous range of service between a connection-oriented service to an almost connectionless service. A connection-oriented service might be obtained by placing every packet derived from a given message in the same batch, an almost connectionless service might be obtained by placing only two consecutive packets from the message in each batch.

In preferred embodiments of the present invention, said datagrams in said one or more batches include a time parameter which is substantially equal to the time of generation of the first datagram of said batch, said new route entry has a start time associated with it; and said identification step involves identifying datagrams having a time parameter which precedes the indicated start time as belonging to a trailing subset of one of said one or more batches of datagrams.

By identifying only that a received datagram belongs to a trailing subset whose transmission started before the start time of the new route, the need to examine a batch identifier that would otherwise have to be carried in the packet is obviated. This means that individual batch identifiers need not be stored at the network node or in packets which are members of the batch.

Other aspects of the present invention are set out in the accompanying claims.

BRIEF DESCRIPTION OF THE DRAWINGS

There now follows a description of specific embodiments of the present invention. The embodiments are described by way of example only, with reference to the accompanying figures in which:

FIG. 3 shows a pair of entries in a routing table stored in one of the routers of the internetwork of FIG. 1;

FIG. 6 shows one of the packets of FIG. 5 in more detail;

FIG. 7 shows another of the packets of FIG. 5 in more detail; and

DETAILED DESCRIPTION OF EXEMPLARY EMBODIMENTS

Figure 1:
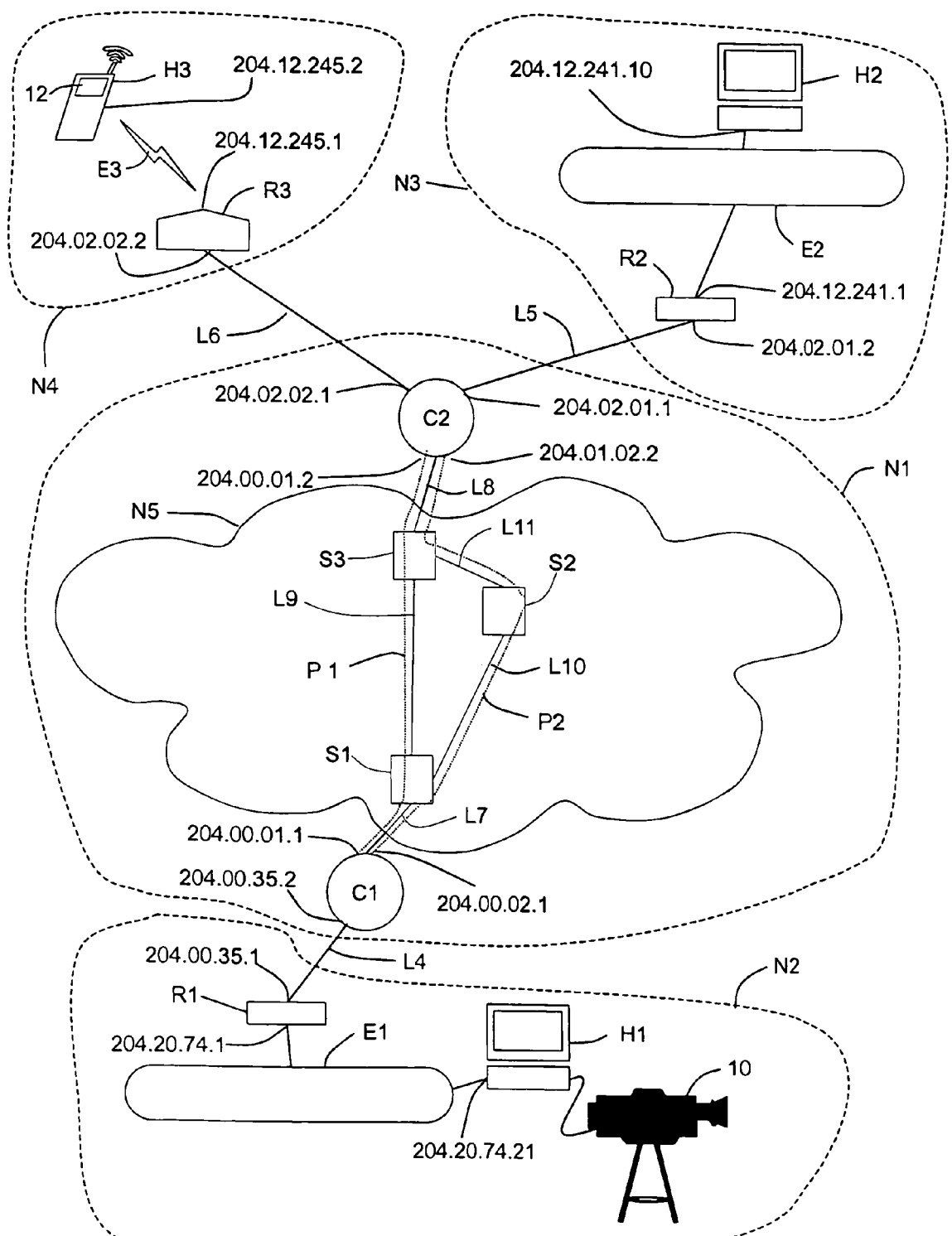
FIG. 1 shows an internetwork which operates in accordance with a first embodiment of the present invention.

FIG. 1 shows an internetwork comprising a southern Local Area Network (LAN) N2, a Wide Area Network (WAN) N1, a north-eastern LAN N3, a north-western LAN N4 and links L4, L5, L6 therebetween. The southern LAN N2 is connected via a southern outer link L4 to the WAN N1. The WAN N1 is connected by a north-eastern outer link L5 to north-eastern LAN N3 and by a north-western outer link L6 to north-western LAN N4.

The WAN N1 comprises a southern core router C1, a northern core router C2 and an Frame Relay network N5 that interconnects them. The southern core router C1 is connected to the northern end of the southern outer link L4. The northern core router C2 is connected to the southern ends of the north-eastern outer link L5 and the north-western outer link L6.

The Frame Relay network N5 includes a southern core switch S1, an eastern core switch S2 and a northern core switch S3. A southern intermediate link L7 connects the southern core switch S1 to the southern core router C1. A northern intermediate link L8 connects the northern core switch S3 to the northern core router C2. A first inner link L9 interconnects the southern core switch S1 to the northern core switch S3. Eastern core switch S2 is connected to the southern core switch S3 and the northern core switch S1 by second inner link L10 and third inner link L11 respectively.

As will be understood by those skilled in the art, the Frame Relay network N5 is configured to provide a direct Permanent Virtual Connection (PVC) P1 between the southern core switch S1 and the northern core switch S3, which direct PVC uses the first inner link L9. The Frame Relay network N5 is further configured to provide an indirect PVC P2 between the same switches S1,S3, which indirect PVC P2 utilises second inner link L10, second core switch S2 and third inner link L11. Each of the PVCs is configured to provide a 2 Mbits$^{-1}$ service across the Frame Relay Network N1.

The southern LAN N2 comprises a LAN E1 that operates in accordance with the IEEE 802.3 standard and two devices connected thereto, namely a video workstation H1 and southern router R1. The video workstation H1 includes a video card which is connected to a video camera 10. The network software in video workstation H1 differs from normal TCP/IP networking software in a way that will be described in relation to FIG. 3 below. Southern router R1 is connected to the southern end of the southern outer link L4.

The north-eastern LAN N3 comprises a LAN E2 that operates in accordance with the IEEE 802.3 standard and two devices connected thereto, namely a personal computer H2 and north-eastern router R2. North-eastern router R2 is connected to the northern end of the north-eastern outer link L5.

The north-western LAN N4 comprises a wireless LAN E3 which operates in accordance with the IEEE 802.11 standard and which interconnects a wireless IP router R3 and a mobile handset H3. The mobile handset H3 is arranged to be able to provide a video display to its user on screen 12. The wireless IP router R3 is connected to the northern end of the north-western outer link L6.

In the example described, the internetwork (FIG. 1) is configured so the interfaces between elements of the outer networks N2, N3, N4 have the IPv4 addresses set out in Table 1 below:

Within the WAN N1, the southern core router C1 is configured to have two IP addresses assigned to the southern intermediate link L7. One of those IP addresses is associated with the PVC P1, the other is associated with the PVC P2. The northern core router C2 is equivalently configured. In the present example, the IP addresses assigned to those interfaces are as set out in Table 2 below.

TABLE 2

| Interface | IP address | Interface | IP address |
| --- | --- | --- | --- |
| C1 to P1 | 204.00.01.1 | C2 to P1 | 204.00.01.2 |
| C1 to P2 | 204.00.02.1 | C2 to P2 | 204.00.02.2 |

The video workstation H1 is arranged to receive video data from the video camera 10 and process it to provide encoded video data. The encoded video data is arranged into 1.25 Kbyte blocks. The video data encoding process is such that a 20 ms video frame which differs substantially from its predecessor produces ten 1.25 Kbyte blocks of encoded video data. Frames which generate ten blocks of encoded video data are hereinafter referred to as key frames—key frames might, for example, result from video camera 10 panning across the scene in front of it. The ten blocks produced in response to a key frame are referred to hereinafter as a key frame block group. In contrast to key frames, a 20 ms frame which differs only in minor details from the previous frame generates only one 1.25 Kbyte block of data. Such frames are referred to herein as ordinary frames and the blocks of data that encode them as ordinary blocks. The video data encoding process places a sequence number in each block and also labels the fifth ordinary block of any series of consecutive ordinary blocks as a quiet period indicator block.

Figure 2A:
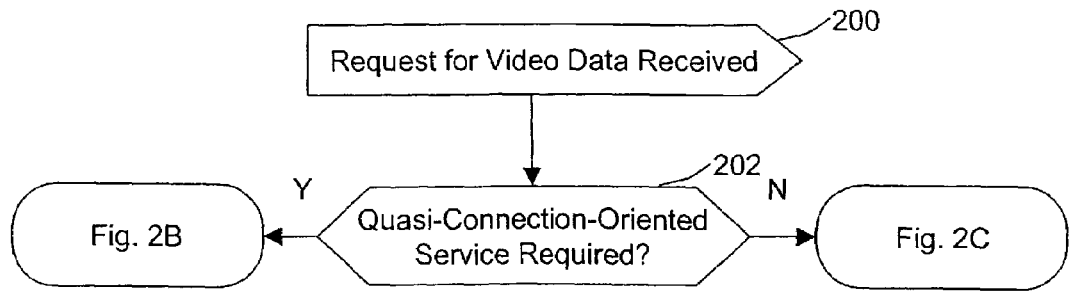
FIGS. 2A, 2B and 2C are flow charts illustrating the operation of a packet source which operates in accordance with a first embodiment of the present invention.
Figure 2B:
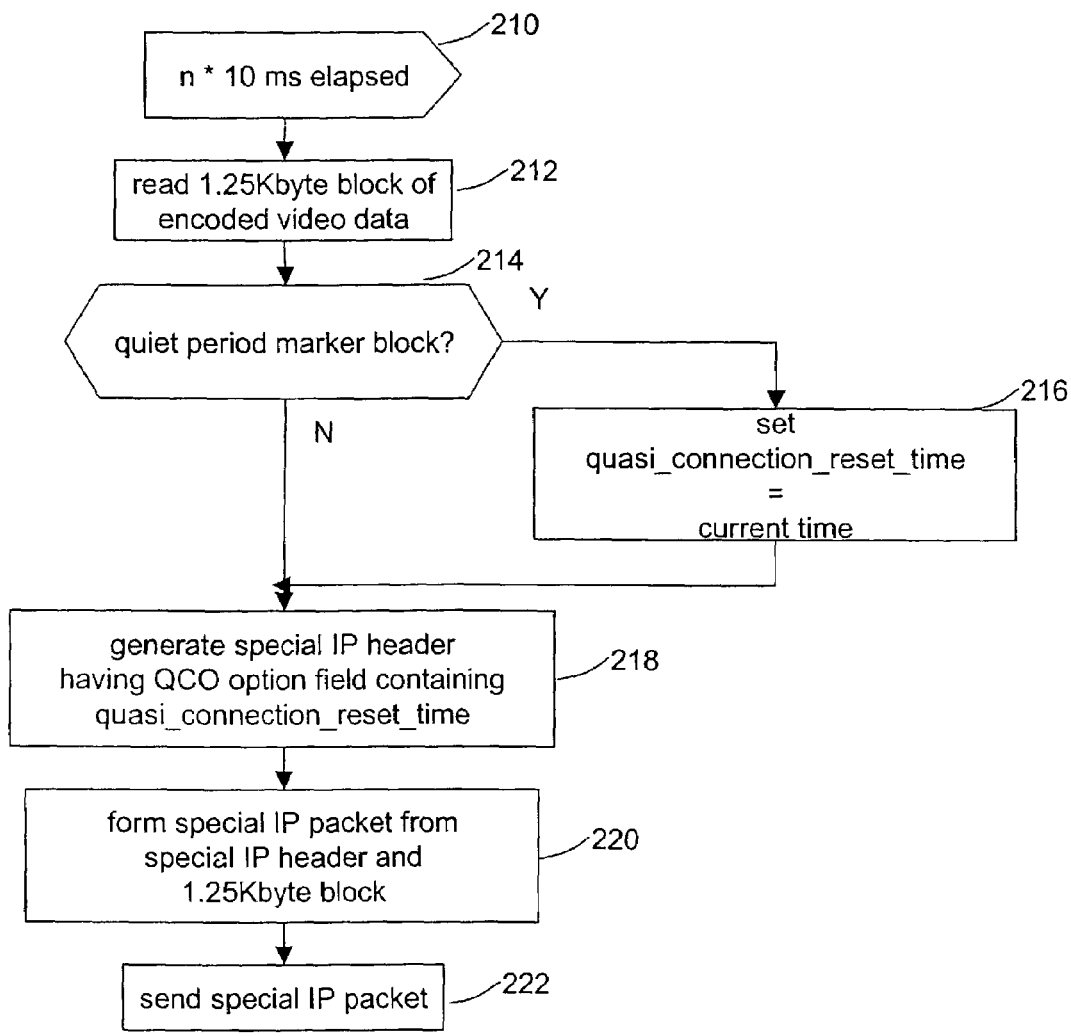
Figure 2C:
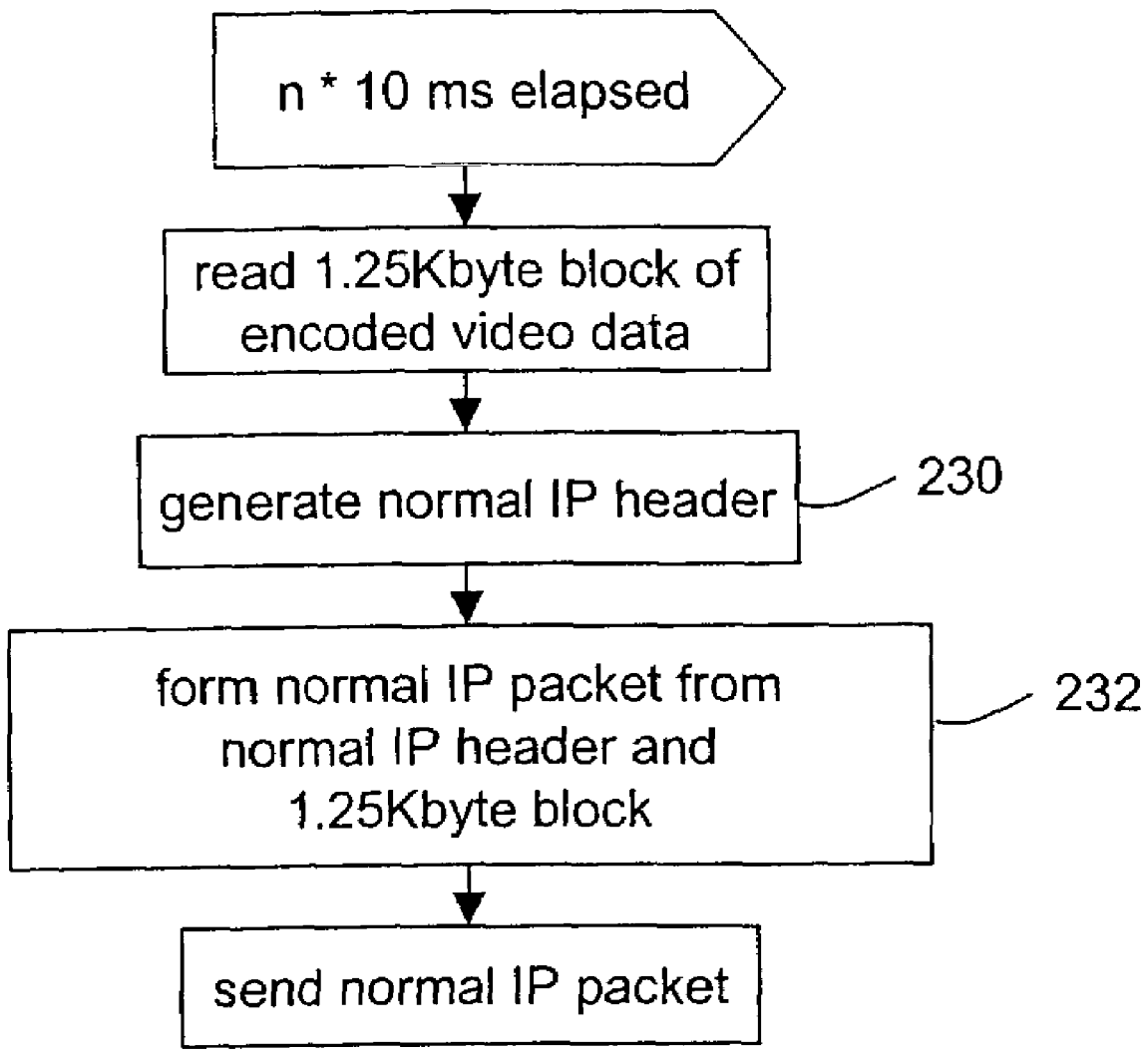

The video workstation H1 is further arranged to respond to requests for live video data from devices attached to the internetwork (FIG. 1) by operating an encoded video data packet generation process (FIGS. 2A, 2B and 2C).

On receipt of a request for video data (step 200) the workstation H1 first finds whether the device requesting the video data requires a quasi-connection-oriented service or not (step 202). In the present embodiment this is achieved by noting the TCP/UDP port number on which the request arrives. If a quasi-connection-oriented service is required then the workstation H1 operates in accordance with a special packet generation process (FIG. 2B). If a quasi-connection-oriented service is not required then the workstation H1 instead operates in accordance with a normal packet generation process (FIG. 2C).

The special packet generation process (FIG. 2B) is carried out once every 10 ms (step 210). The process begins with the retrieval (step 212) of a 1.25 Kbyte block of data produced by a video data encoding process. Thereafter, the workstation H1 finds (step 214) whether that 1.25 Kbyte block is a

TABLE 1

| Interface | IP address | Interface | IP address | Interface | IP address |
| --- | --- | --- | --- | --- | --- |
| H1 to E1 | 204.20.74.21 | H2 to E2 | 204.12.241.10 | H3 to E3 | 204.12.245.2 |
| E1 to R1 | 204.20.74.1 | E2 to R2 | 204.12.241.1 | E3 to R3 | 204.12.245.1 |
| R1 to L4 | 204.00.35.1 | R2 to L5 | 204.02.01.2 | R3 to L6 | 204.02.02.2 |
| L4 to C1 | 204.00.35.2 | L5 to N1 | 204.02.01.1 | L6 to C1 | 204.02.02.1 | quiet period indicator block. If it is, then a quasi_connection_reset_time parameter is updated with the current time (step 216). In either case, control next passes to a special header generation step (step 218).

The special IP header generation step (step 218) generates a packet header which is constructed substantially in accordance with the Internet Protocol version 4 (Ipv4) but which has an additional 32-bit field at the end of the header. Such fields are known as 'option' fields in the art. Some options have already been standardised. However the option in the present case is new and is referred to herein as a 'QCO Option'. The first byte of the thirty-two bits contains a value identifying the option as a QCO Option, the last three bytes provide a quasi-connection reset time field. The quasi_connection_reset_time set in the most recent update step (step 216) is written into the quasi-connection reset time field. That time is expressed as the number of hundredths of seconds that had elapsed in the current day (Greenwich Mean Time) at the time that the quasi_connection_reset_time parameter was last set (in the present description all times will be represented in 24-hour time-of-day notation).

The special header thus generated is appended to the 1.25 Kbyte block of video data to form a special IP packet (step 220). As soon as that packet is formed it is transmitted onto the LAN E1 (step 222).

It will be seen that the special IP packet generation process (FIG. 2B) generates a packet containing around 1.25 Kbytes of data every 10 ms. This leads to the transmission of data onto the LAN E1 at a rate of around 1 Mbits$^{-1}$.

The normal packet generation process (FIG. 2C) is similar to the special packet generation process (FIG. 2B) save that it does not involve a check to find whether the current 1.25 Kbyte block is a quiet period indicator block and the consequent updating of the quasi_connection_reset_time parameter. Also, the header generation step (step 230) and the packet generation step (step 232) differ in that the generated header does not include a QCO option field.

Both packet generation processes produce one packet per block of encoded video data. Packets carrying quiet period indicator blocks are referred to a quiet period indicator packets, packets carrying key frame initial blocks are referred herein as key frame initial packets and the group of packets corresponding to a key frame block group are referred to herein as a key frame packet group.

FIG. 3 shows an excerpt from the routing table stored in southern core router C1. Each routing table entry comprises a destination IP address parameter, a route number parameter, a route update time parameter, a next hop IP address parameter and a physical output port parameter. The routing table formation software is similar to conventional routing table formation software but enables the operator of the router C1 to make one or more further routing table entries for one or more selected destination addresses. On making such further routing table entries, the operator also provides a route update time parameter to be associated with the entry. The software controls the router C1 to automatically rank entries for a given destination address on the basis of their route update time parameter. The entry having the earliest route update time has its route number parameter set to 1, the next earliest has its route number set to 2 and so on. If the number of routing table entries for that destination address has already reached a predetermined maximum number (5 say), then the router is arranged to delete the routing table entry whose route number parameter is set to one and decrement the route number of each of the other stored routes for that destination by one.

Those skilled in the art will be able to generate suitable routing table formation software for the router C1.

As will be understood by those skilled in the art, the value in the destination IP address field in FIG. 3 applies to all destination addresses in the range 204.12.240.0 to 204.12.255.255—i.e. any addresses whose first twenty bits are identical to the first twenty bits of the address 204.12.240.0. This has the result that packets addressed to either a device attached to the north-eastern network N4 or a device attached to the north-western network N3 are routed using only the routing table entries illustrated in FIG. 3.

Figure 4:
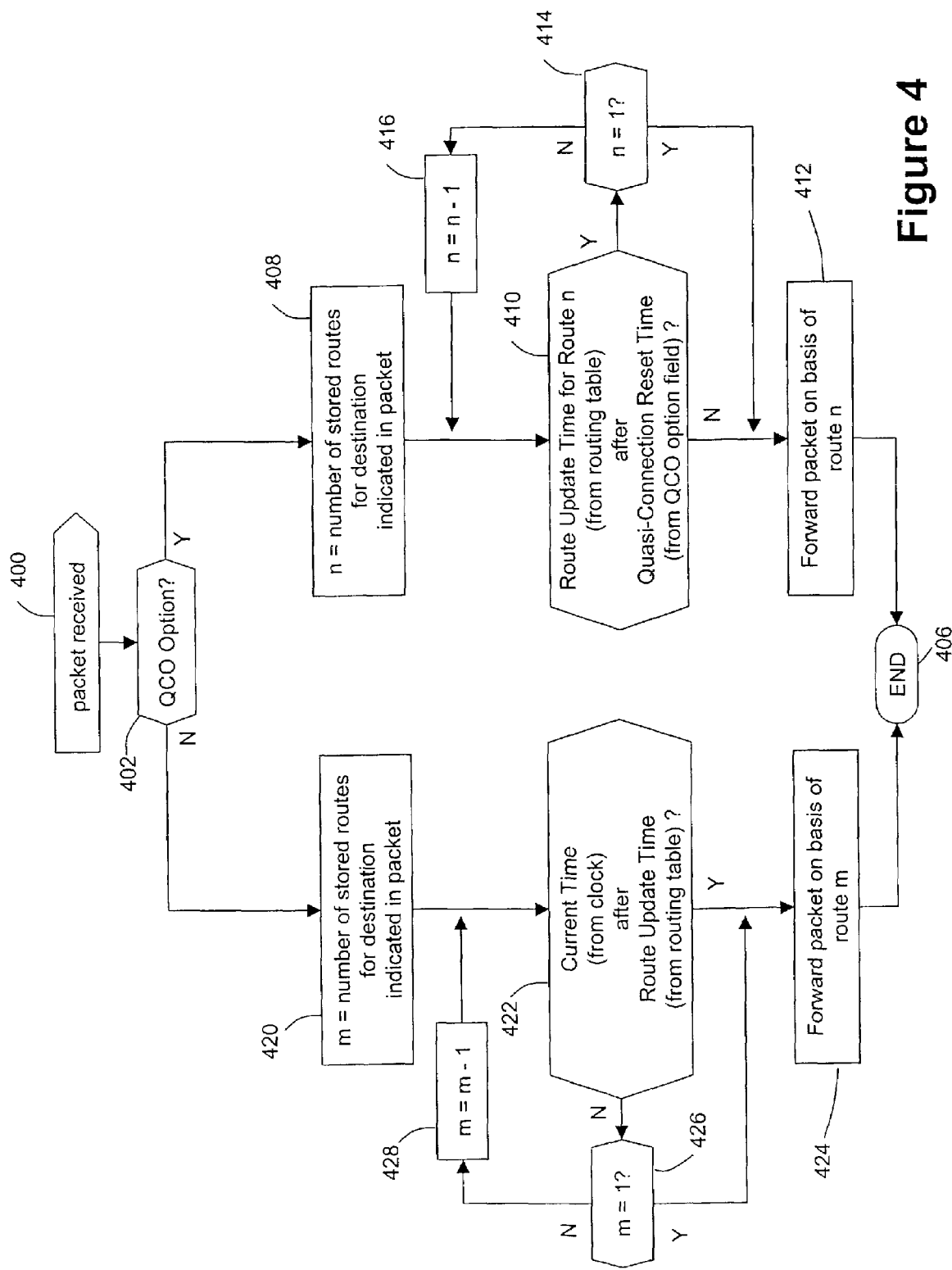
FIG. 4 is a flow chart illustrating the forwarding process carried out by one or more of the routers of FIG. 1.

The southern core router C1 is arranged to route packets received at C1 by carrying out a routing process illustrated by the flow chart of FIG. 4.

On a packet being received (step 400) the router C1 first finds (step 402) whether the QCO Option is present in the header of the packet.

If the QCO option is present (i.e. the packet is a special packet), then a counter n is initialised to a value (step 408) equal to the number of routing entries currently stored for the destination address found in the packet. Thereafter, the quasi-connection reset time is read from the packet header and compared to the route update time associated with route number n. If the quasi-connection reset time is later than the route update time then the packet is forwarded (step 412) on the basis of that route.

If the quasi-connection reset time is earlier than the route update time then a first check is carried out to find whether the route associated with the route update time is in fact the only routing entry for the packet (step 414). If it is the only entry, then the packet is forwarded on the basis of that entry (step 412).

If, on the other hand, one or more other routing entries exist for the packet's destination address then a searching process (steps 416, 410, 414) is carried out to find the routing table entry whose route update time most closely precedes the quasi-connection reset time found in the header of the special packet.

Each round of the searching process begins by decrementing the counter n by 1 (step 416). Thereafter, the route update time associated with route number n is compared to the quasi-connection reset time. If the route update time for that route number precedes the quasi-connection reset time then the routing table entry whose route update time most closely precedes the quasi-connection reset time has been found and the packet is forwarded on the basis of that routing table entry (step 412). Otherwise, the current round of the searching process continues with a check (step 414) that the counter has not reached one (i.e. that other routing table entries for this destination remain to be searched). If no such routing table entries exist, then there is no routing entry having a route update time that precedes the quasi-connection reset time, so the packet is forwarded on the basis of the route having the oldest route update time available (step 412).

If the counter is still greater than one then a further round of the searching process described above is carried out.

It will be realised that for special packets having a QCO option, the effect of the routing process shown in FIG. 4 will be to forward those packets on the basis of the routing table entry whose route update time parameter most closely precedes the quasi-connection reset time parameter found in the QCO option field of the special packet.

If the QCO option is found not to be present (step 402) then a counter m is initialised to a value (step 420) equal to the number of routing entries currently stored for the destination address found in the packet. Thereafter, the current time (GMT) is compared to the route update time stored associated with route number m. If the time is now later than the route update time then the packet is forwarded (step 422) on the basis of that route.

If the route update time has not yet been reached then a first check is carried out to find whether the route associated with the route update time is in fact the only routing entry for the packet (step 426). If it is the only entry, then the packet is forwarded on the basis of that entry (step 424).

If, on the other hand, one or more other routing entries exist for the packet's destination address then a searching process (steps 428, 422, 426) is carried out to find the routing table entry with the most recent route update time.

Each round of the searching process begins by decrementing the counter m by 1 (step 428). Thereafter, the route update time associated with route number m is compared to the current time. If the route update time for that route number has already occurred then the routing table entry with the most recent route update time has been found and the packet is forwarded on the basis of that routing table entry (step 424). Otherwise, the current round of the searching process continues with a check (step 426) that the counter m has not reached one (i.e. that other routing table entries for this destination remain to be searched). If no such routing table entries exist, then there is no routing entry having a route update time that precedes the current time, so the packet is forwarded on the basis of the route having the closest route update time (step 424).

If the counter m is still greater than one then a further round of the searching process described above is carried out.

It will be realised that for normal packets, the effect of the routing process shown in FIG. 4 will be to forward those packets on the basis of the routing table entry with the most recent route update time parameter.

A specific example of the performance of the internetwork (FIG. 1) will now be described with reference to FIGS. 5, 6, 7 and 8.

For the purposes of this example it is assumed that the personal computer H2 connected to the north-eastern LAN N3 requests the video workstation H1 to supply it with live video data representing what the video camera 10 is currently viewing. The personal computer H2 is operating under control of networking software that uses the sequence number contained in the blocks of video data to re-order live video packets that arrive in the wrong order. Since the personal computer H2 therefore does not require the packets to be delivered to it in the right order, the personal computer H2 indicates in its request that it does not require a quasi-connection-oriented service from the internetwork. The video workstation receives the request and responds by carrying out the normal packet generation process (FIG. 2C).

At the same time, the user of mobile handset H3 (connected to the north-western LAN N4) requests the video workstation H1 to supply it with the same live video data. In contrast to the personal computer H2, the mobile handset H3 is arranged to carry out as little data processing as possible. By requesting a quasi-connection-oriented service from the internetwork (FIG. 1) the data processing associated with re-ordering packets is obviated. Hence, the mobile handset H3 requests a quasi-connection-oriented service. The video workstation receives the request and responds by carrying out the special packet generation process (FIG. 2B).

Figure 5:
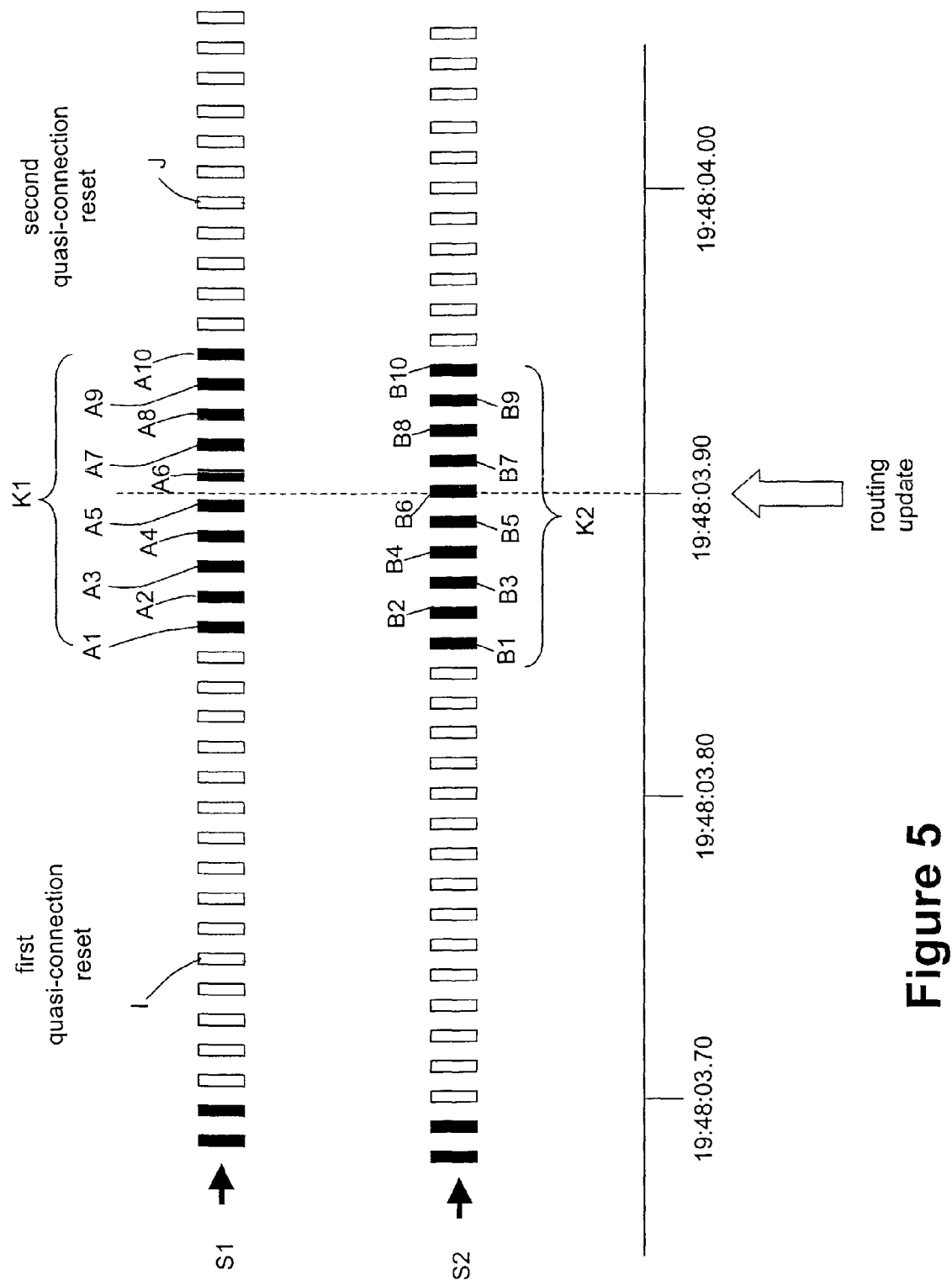
FIG. 5 illustrates an example of a packet sequence received by a router in the internetwork of FIG. 1.

Once both video streams are being generated by the video workstation H1, the packets might arrive at the southern core router C1 as illustrated in FIG. 5. It will be seen that the packets received at the router C1 alternate between those belonging to a stream S1 of special packets addressed to the mobile handset H3 and those belonging to a stream S2 of normal packets addressed to the personal computer H2. The time between packet arrivals is around 5 ms and the arrival of packets is shown over a time period that extends from around 19:48:03:65 until 19:48:04.05.

In the present example, it is assumed that each stream includes a key frame packet group (K1, K2), the initial packets of which arrive at the southern core router at around 19:48:03.85. The key frame special packet group K1 contains special packets A1, A2, A3, A4, A5, A6, A7, A8, A9, and A10. Each of those packets (FIG. 6) has:

a) a destination IP address field set to the IP address of the interface between the mobile handset H3 and the wireless LAN E3 (i.e. 204.12.245.2); and b) a QCO option field containing a quasi-connection reset time parameter set to the transmission time of the quiet period marker packet I (19:48:03.75). (Note that, in the present case, the arrival time at the southern core router C1 is assumed to be substantially simultaneous with the transmission time from the video workstation H1).

The key frame normal packet group K2 contains normal packets B1, B2, B3, B4, B5, B6, B7, B8, B9, and B10. Each of those packets (FIG. 7) has a destination IP address field set to the IP address of the interface between the personal computer H2 and the LAN E2 (i.e. 204.12.241.10) but does not have a QCO option field.

Each of the normal packets B1, B2, B3, B4, B5, B6, B7, B8, B9, B10 in the normal stream S2 leads the corresponding packet A1, A2, A3, A4, A5, A6, A7, A8, A9, A10 in the quasi-connection-oriented stream by 5 ms. The order of arrival of the packets of the key frame packet groups K1, K2 at the southern core router is therefore B1, A1, B2, A2, B3, A3, B4, A4, B5, A5, B6, A6, B7, A7, B8, A8, B9, A9, B10, A10.

In the present example, it is assumed that, prior to or at 19:48:03.90, a second entry (see FIG. 3) for destinations in the range 204.12.204.0 to 204.12.255.255 is added to the routing table, which additional entry has a route update time parameter which indicates the time 19:48:03.90. Such an entry might be added automatically or manually in order to cause data travelling from the southern core router C1 to the northern core router C2 to be carried along the PVC P2 rather than the PVC P1 after 19:48:03.90. This might be done because it is known that the link L9 is to be withdrawn from service at 19:50, or it might be done in order to balance the load placed on different parts of the Frame Relay network N5.

The southern core router carries out the process of FIG. 4 in relation to each of the received packets B1, A1, B2, A2, B3, A3, B4, A4, B5, A5, B6, A6, B7, A7, B8, A8, B9, A9, B10, A10.

For each of the packets A1, A2, A3, A4, A5, A6, A7, A8, A9, A10 in the key frame special packet group K1, step 410 of FIG. 4 will find that the route update time (19:48:03.90) for route number 2 falls after the quasi-connection reset time (19:48:03.75) contained in the QCO option field of the packet (FIG. 6). Hence route number 2 will be disregarded and the packets will be forwarded on the basis of route number 1—i.e. over PVC P1.

For each of the first five packets B1, B2, B3, B4, B5 in the key frame normal packet group K2, step 422 of FIG. 4 will find that the current time (19:48:03.85-.90) is before the route update time associated with route number 2 (i.e. that the route update time has not yet occurred). Hence, the first five packets B1, B2, B3, B4, B5 will be forwarded over route number 1—i.e. over PVC P1.

For each of the last five packets B6, B7, B8, B9, B10 in the key frame normal packet group K2, step 422 of FIG. 4 will find that the current time (19:48:03.90-.95) is after the route update time (19:48:03.90) associated with route number 2 (i.e. that the route update time has now occurred). Hence, the second five packets B6, B7, B8, B9, B10 will be forwarded over route number 2—i.e. over PVC P2.

Figure 8:
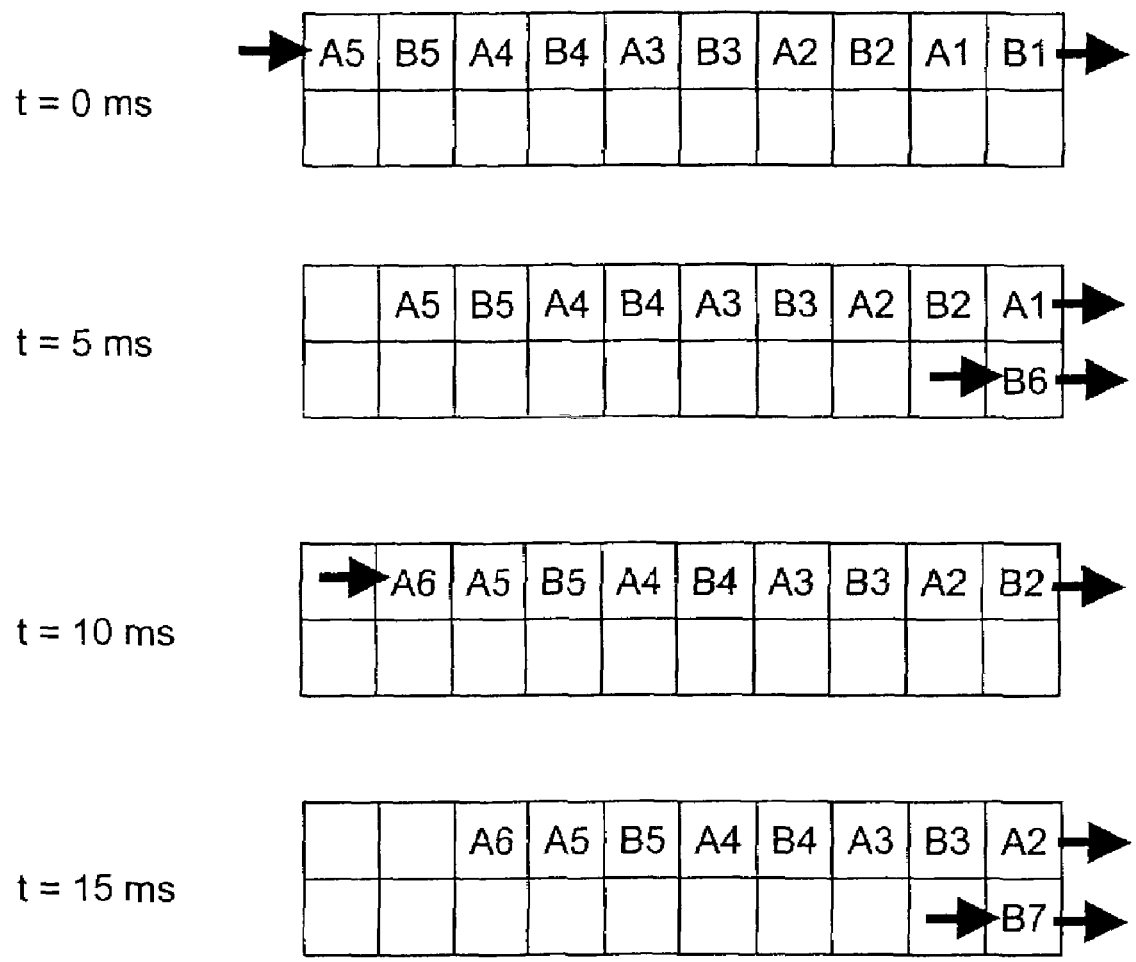
FIG. 8 shows how the packets of FIG. 5 are handled by a router operating in accordance with the forwarding process of FIG. 4.

FIG. 8 is an illustration of the packets queued for the intermediate link L7 at 5 ms intervals from the moment of arrival of the fifth key frame special packet A5. There are two queues associated with the link L7, a first queue Q1 for the PVC P1, and a second queue Q2 for the PVC P2.

In this example, shortly before the arrival of the fifth key frame special packet A5, congestion has resulted in the first queue Q1 storing the nine preceding packets B1, A1, B2, A2, B3, A3, B4, A4, B5.

As stated above the capacity of the PVCs P1 and P2 is 2 Mbits$^{-1}$, so around one packet can be forwarded from each queue every 5 ms. As the fifth key frame special packet A5 arrives, the first packet B1 of the key frame normal packet group K2 is forwarded from the first queue Q1.

After 5 ms, the sixth packet of the B6 of the key frame normal packet group K2 arrives at the southern core router C1 and is placed in the second queue owing to the route update time of route number 2 now having been reached. No other packets are awaiting transmission from the second queue Q2, so it (B6) is forwarded immediately over the PVC P2.

The sixth packet A6 of the key frame special packet group K1 arrives 5 ms later. Unlike the previously received packet B6, A6 is forwarded to the first queue Q1 because the route update time is later than the quasi-connection reset time indicated in the QCO option field of the sixth key frame special packet A6. At the same time, the second packet B2 of the key frame normal packet group K2 is forwarded over the PVC P1.

After another 5 ms interval, the seventh packet B7 of the key frame normal packet group K2 arrives at the router C1, is placed in the second queue Q2, and is immediately forwarded over the PVC P2.

If the delays over the PVCs P1 and P2 are equal, then it will be realised that packets will arrive at northern core router C2 in the order that they were sent from southern core router C1. It will be seen that the packets of the key frame normal packet group K2 have already become jumbled—the order of sending so far is first normal packet B1, sixth normal packet B6, second normal packet B2, seventh normal packet B7. This results in the personal computer H2 receiving the packets in that order.

In contrast, the special packets of the key frame special packet group K1 are all sent to the same queue and hence do not become jumbled and arrive at the mobile handset H3 in the right order.

Around 50 ms after the last of the key frame packets A1-B10 has arrived at the router C1, the router receives a special packet J which has a quasi-connection reset time parameter set to 19:48:04.00. It will be realised that this results from the block of video data carried in packet J being found to be the fifth consecutive ordinary block in step 214 (FIG. 2) and hence the quasi_connection_reset_time being updated in step 216.

Hence, the router operating in accordance with FIG. 4 finds that the route update time for route number 2 precedes the quasi-connection reset time indicated in the header and hence forwards the packet along route number 2—i.e. along the second PVC P2.

It will be realised that the change in route might still result in packet re-ordering. However, re-ordering of the ordinary packets will have a less deleterious effect on the video displayed by the mobile phone than would be caused by re-ordering of the key frame packets.

It will be seen how the first embodiment provides a quasi-connection-oriented service to the network user. By only updating the quasi-connection reset times at time when packet re-ordering is less likely to cause significant problems, the user is able to receive a service that provides a more ordered packet stream than a connectionless service. By enabling the network operator to re-route traffic flows during the lifetime of a traffic flow the network operator is better able to manage the flow of traffic around its network than it could were it offering a connection-oriented service.

A number of features of the above-described embodiment can be changed in order to provide alternative embodiments of the present invention. Possible changes include:

i) Even datagrams that are not part of datagram streams that require a quasi-connection-oriented service might be formed as special packets, but with the time of transmission being the time of transmission of that particular datagram.

ii) the update to the quasi-connection reset time in the datagrams could be made in response to a signal from the network rather than independently thereof. This signal could be generated in good time before a change in the routing of traffic across the network takes place.

iii) the invention is, of course, useful in relation to many types of traffic other than video streams. In relation to streams of voice data packets, for example, the quasi-connection reset time could be updated each time that a voice activity detector judges the speaker to have been silent for more than 1 s, say.

iv) a maximum limit could be placed on the age of a routing table entry—once the route was that old the routing table entry would be deleted.

v) The routing updates could be those provided by known dynamic routing algorithms, with the routing processes in the node being altered such the previous route is stored rather than being substituted.

The section of the special packet stream extending between packet I and packet J in the above-described example can be regarded as a 'virtual packet'. The creation of such 'virtual packets' enables a network to operate in a connection-oriented like mode of operation for a period that may be shorter than the duration of a session but longer than that of a single datagram. In other words, separate virtual packets are treated in a connectionless manner, while their component datagrams are treated in a connection-oriented manner. Therefore, simply by adjusting the size and duration of its virtual packets, an application will be able to create a dynamic mix of connectionless and connection-oriented modes of operation within a single session. In terms of the virtual packet concept, today's connectionless networks are a special case where the virtual packet is equivalent to a single datagram, whereas connection-oriented networks are a special case where the virtual packet is equivalent to a virtual circuit.

What is claimed is:

1. A method of operating a datagram network node having at least one input channel and a plurality of output channels, said method comprising:

forwarding leading subsets of one or more respective batches of datagrams in accordance with a stored extant route entry comprising an indication of a datagram-carried routing identifier and an associated extant output channel;

storing a new route entry comprising an indication of said datagram-carried routing identifier and an associated extant output channel;

forwarding one or more datagrams in accordance with said new route entry;

subsequently identifying one or more datagrams as members of a trailing subset of said one or more batches of datagrams; and forwarding members of said trailing subset in accordance with said extant route entry.

2. A method according to claim 1 wherein:

said datagrams in said one or more batches include a time parameter which is substantially equal to the time of generation of the first datagram of said batch;

said new route entry has a start time associated with it; and said identification step involves identifying datagrams having a time parameter which precedes the indicated start time as belonging to a trailing subset of one of said one or more batches of datagrams.

3. A method according to claim 2 wherein said datagram-carried routing identifier comprises a destination address.

4. A method according to claim 1 wherein said datagram-carried routing identifier comprises a destination address.

5. A method of operating a datagram network comprising:

operating a datagram source to:

divide a message into a plurality of sets of one or more datagrams, include a time parameter in each datagram of one or more of said sets that comprise a plurality of datagrams which datagram time parameter reflects the time of transmission of said set, and to forward said datagrams onto said network;

storing a plurality of routes and associated route time parameters for use by at least one node in said datagram network; and operating said at least one node to forward datagrams in accordance with one of said plurality of routes selected in dependence upon a comparison of said datagram time parameter and said route time parameter.

6. A datagram network node comprising:

a plurality of interfaces for communication across physical communications links;

a routing store storing:

a) a routing identifier;

b) a plurality of output interface indications associated with said routing identifier; and c) for at least one of said plurality of output interface indications, an indication of a routing update time;

means for receiving, on an input interface, a datagram including a routing identifier indication and an indication of an effective time of routing;

means arranged in operation to select one of said plurality of output interface indications in dependence upon a comparison of said routing update time and said effective time of routing; and means arranged in operation to forward said datagram from the output interface indicated by said selected output interface indication.

* * * * *